July 19, 1938.  C. F. HIRSHFELD  2,124,350

WHEEL ASSEMBLY

Filed July 15, 1936

INVENTOR.
CLARENCE F. HIRSHFELD
BY
ATTORNEY.

Patented July 19, 1938

2,124,350

UNITED STATES PATENT OFFICE 2,124,350

WHEEL ASSEMBLY

Clarence F. Hirshfeld, Detroit, Mich., assignor to Transit Research Corporation, New York, N. Y., a corporation of New York Application July 15, 1936, Serial No. 90,679

9 Claims. (Cl. 295—11)

This invention relates to resilient wheels, particularly for rail vehicles, of the type wherein the hub is supported from a tire through the medium of slabs or discs of elastic material under shear loading.

The wheel as herein contemplated is composed of a hub portion having main plate members radiating therefrom, a tire or rail contacting portion equipped with a wide web and slabs or discs of rubber between the web and each plate member adapted to transmit the loading of the hub to the tire in shear. For purposes of centering during assembly, for easy replacement and for many other reasons it has been found desirable to surface bond to each major surface of each rubber disc a thin disc of metal and to dowel these metallic discs to the main plates and web. A number of different types of dowels have been sheared off during running operation and others have lost position in their holes. It is therefore an object of this invention to provide an improved form of dowel which will not shear off during operation and which will not tend to distort the metallic discs whereby loss of anchorage in the holes can occur.

Figure 1:
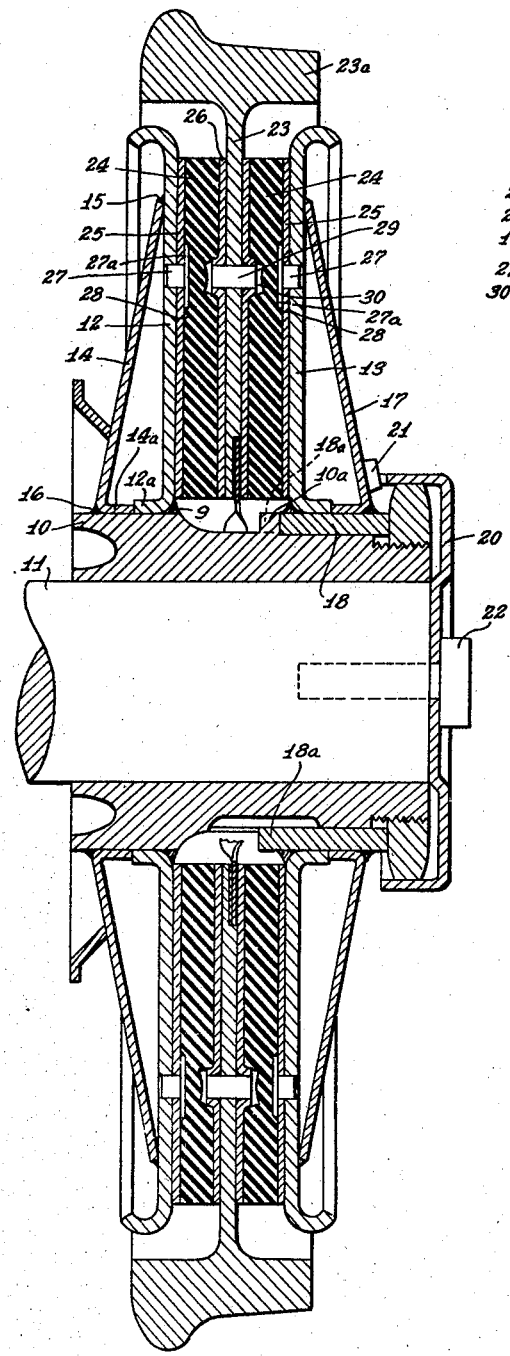
Figure 2:
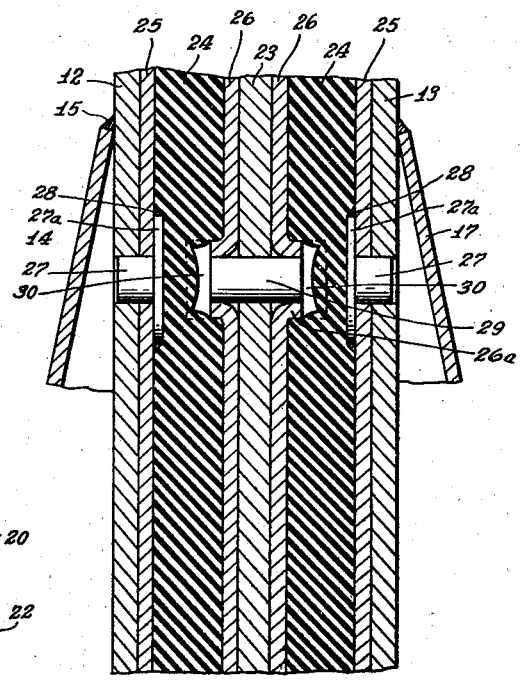
Figure 3:
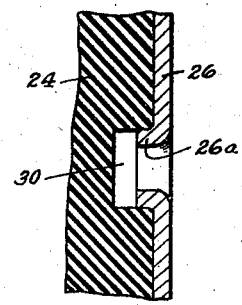

Other objects and advantages will become hereinafter more fully apparent as reference is had to the accompanying drawing wherein:

Figure 1 is a sectional view, taken through the axis, of one of the preferred embodiments of my invention, Figure 2 is a fragment of Figure 1 on an enlarged scale, Figure 3 is a sectional view of a part of the wheel shown in Figure 1 before assembly.

The embodiment of the invention shown in the drawing comprises a hub 10 pressed onto the end of an axle 11 and having two circular side plates 12 and 13 radiating therefrom. The side plate nearest the center of the axle 11 has a central flange 12a fitting over the hub 10, the base of the flange 12a being welded to the hub 10 at 9 to permanently secure them together. In addition, the side plate 12 is supported by a frusto-conical bracing plate 14 whose concave side faces the outer face of the side plate 12, the periphery of the bracing plate 14 being welded to the side plate 12 at 15. The center of the bracing plate 14 is formed into a collar or flange 14a fitting over the inner end of the hub 10 and is welded thereto at 16.

The other side plate 13 is similarly formed and provided with a similar bracing plate 17 welded thereto, but this side plate 13 and bracing plate 17, instead of being welded to the hub 10, are welded to a sleeve 18 which slides over the outer end of the hub 10 so that they can be removed. The outer end of the hub 10 is smaller in diameter than the inner end, allowing the sleeve 18 which fits over it to have the same outside diameter as the inner end of the hub and permitting the two side plates 12 and 13 and the two bracing plates 14 and 17 to be duplicates.

The sleeve 18 is prevented from rotating with respect to the hub 10 by having its end notched or castellated, the resulting rectangular teeth 18a fitting between cooperating teeth 10a on the hub. The sleeve 18 is held against the teeth 10a on the hub 10 by a ring-like nut 19 screwed onto the end of the hub 10. The nut is locked by a cap 20 whose interior is shaped to fit the sides of the nut 19. The cap 20, in turn, is prevented from rotating by a slot in its edge which engages a lug 21 on the adjacent bracing plate 17 and is held in place by a small bolt 22 extending into the end of the axle 11.

A central plate or web 23 lies midway between the two side plates 12 and 13 and carries a tire 23a formed integrally with it. A large aperture in the middle of the central plate 23 allows the hub 10 to pass through it with considerable clearance. Thus the central plate and hub will never be in direct contact. Instead the load will at all times be transmitted in shear from the central plate 23 to the side plates 12 and 13 through the cushioning elements 24 which lie between them and carry the load.

The cushioning elements comprise circular slabs or discs of rubber 24, with thin sheets or discs 25 and 26 of metal bonded to the sides of the slabs 24 and connected to the plates 12, 13 and 23. In the embodiment of the invention illustrated, there are two slabs of rubber 24, one at each side of the central plate 23 and between it and the side plates 12 and 13, and they are made thick enough so that they and the central plate 23 are clamped tightly together between the side plates 12 and 13 when the outer side plate 13 and the sleeve 18 which carries it are forced into position by the large nut 19 on the end of the hub.

The slabs of rubber 24 are surface bonded to metallic discs or sheets 25 and 26 distinct from and removably connected to the plates 12, 13 and 23 against which they lie, the slabs of rubber and the sheets 25 and 26 thus form removable and replaceable springing elements.

The means for connecting the discs 25 to the side plates 12 and 13 consists of dowels or studs 27 projecting through holes in the discs and into accurately fitting holes in the side plates and having large flat heads 27a with their peripheries welded at 28 to the discs 25. The large flat heads 27a on the studs 27 allow the load to be transmitted from the studs 27 to the discs 25 not only where the discs encircle and fit against the studs 27 but also around the circumferences of circles of considerably larger diameter where the edges of the heads 27a are welded to the sheets 25. The heads 27a thus reinforce the sheets 25 and keep the dowels or studs 27 perpendicular to the discs 25 and plates 12 and 13 even though the studs 27 are subjected to offset forces tending to bend them over by buckling the discs.

The means for connecting the metallic discs 26 to the central plate 23 comprise pins 29 extending through the plate 23 with an accurate or driving fit and projecting and fitting into holes in the adjacent discs 26 at each side. The holes in the discs are surrounded and reenforced by flanges or collars 26a formed integrally with the disc 26 and extending into the rubber 24, the interior of the collars 26a providing large bearing surfaces for the pins 29 and the pins 29 having large area of contact with the web 23 on account of the thickness thereof. The slabs of rubber 24 are provided with recesses 30 over the flanges or collars 26a to prevent the rubber 24 from coming into contact with the ends of the pins 29, to which it cannot be bonded, and being injured thereby as the rubber 24 moves during operation. These recesses 30, when formed, have the shape shown in Figure 3 and, in dotted lines, in Figure 2, but are squeezed down to the shape shown in full lines in Figure 2 when the wheel is assembled and the slabs of rubber 24 are laterally compressed slightly by the tightening up of the large nut 19 on the outer end of the hub 10.

The embodiment shown is preferred over other embodiments of the invention, such as those in which studs, similar to the studs 27, are used to connect the sheets 26 to the central web 23 or in which the sheets lying against the outer plates 12 are formed with collars, similar to the collars 26a, fitting over pins projecting from the outer plates 12, because the particular construction shown employs the collar construction only where the pin can be symmetrically loaded and employs the stud with a large head where the loading is necessarily eccentric. While only the preferred embodiment has been shown and described in detail, my invention is not limited thereto, as will be seen by the scope of the accompanying claims.

What I claim is:

1. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including a pin extending through said central plate and into apertures in the sheets on either side thereof, said apertures being reenforced by encircling flanges integral with said sheets.

2. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including a pin extending through said central plate and into apertures in the sheets on either side thereof, said apertures being reenforced by encircling flanges integral with said sheets and forming short tubes projecting into the slabs of rubber.

3. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including a pin extending through said central plate and into apertures in the sheets on either side thereof, said apertures being reenforced by encircling flanges integral with said sheets, and said slabs of rubber being recessed at said apertures.

4. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including a pin projecting from one of said plates into an aperture in the adjacent sheet, said aperture being reenforced by a flange integral with said sheet.

5. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including a pin projecting from one of said plates into an aperture in the adjacent sheet, said aperture being reenforced by a flange integral with said sheet and forming a short tube projecting into the rubber slab bonded to said sheet.

6. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including a pin projecting from one of said plates into an aperture in the adjacent sheet, said aperture being reenforced by a flange integral with said sheet, and forming a short tube projecting into the rubber slab bonded to said sheet, said rubber slab being recessed at the mouth of said tube.

7. A wheel comprising a hub, a pair of spaced radial side plates secured thereto, a radial central plate lying between said side plates and spaced radially from said hub, a tire carried by said central plate, flat slabs of rubber lying between said plates and resiliently connecting said central plate to said side plates, sheets of metal bonded to the faces of said slabs of rubber and lying against said plates, and means to prevent sliding of said sheets with respect to said plates including projections extending from said plates into apertures in the adjacent sheets, said slabs of rubber being recessed at said apertures.

8. A springing element comprising a slab of rubber and thin sheets of metal bonded to the opposite faces of said slab, one of said sheets of metal having an aperture therethrough surrounded by a sleeve integral with said sheet and projecting toward the other sheet.

9. A springing element as described in claim 8 in which the rubber slab is recessed at said aperture.

CLARENCE F. HIRSHFELD.